[117.] 2 Sheets--Sheet 1.

CHARLES N. TYLER.

Improvement in Wash Boilers.

No. 4,544. Reissued Sep. 5, 1871.

Attest;
Edw. F. Brown.
J. Franklin Pergash

Inventor;
Charles N. Tyler

[117.] 2 Sheets--Sheet 2.
CHARLES N. TYLER.
Improvement in Wash Boilers.
No. 4,544. Reissued Sep. 5. 1871.
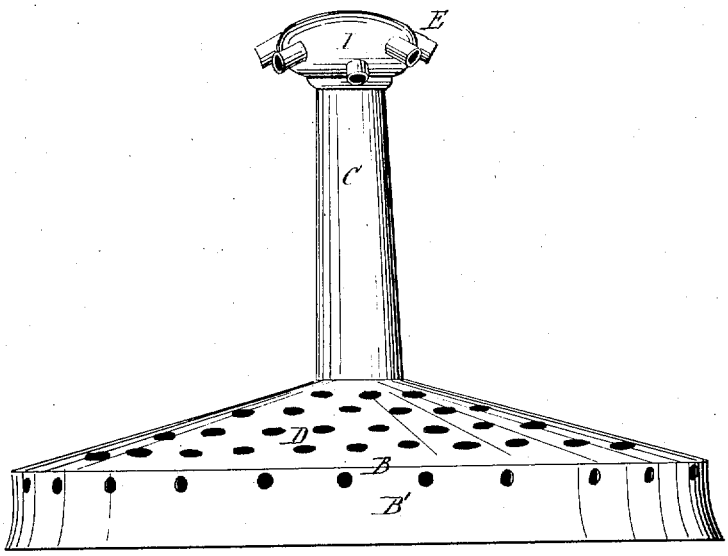
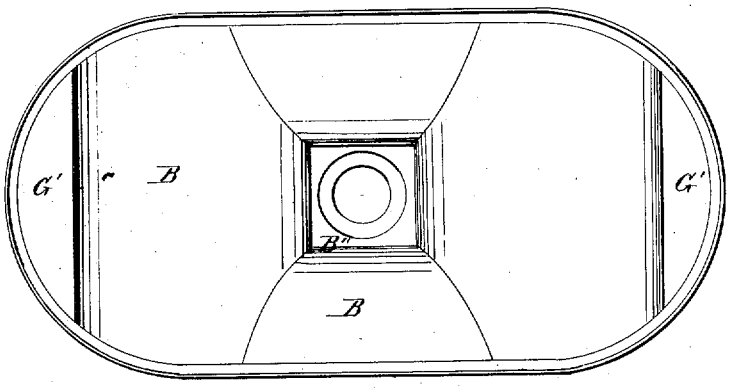
Attest
Edw. F. Brown
S. Franklin Pengard
Inventor;
Charles N. Tyler

UNITED STATES PATENT OFFICE.

CHARLES N. TYLER, OF BUFFALO, NEW YORK.

IMPROVEMENT IN WASH-BOILERS.

Specification forming part of Letters Patent No. 84,918, dated December 15, 1868; reissue No. 4,544, dated September 5, 1871.

*To all whom it may concern:*

Be it known that I, CHARLES N. TYLER, of Buffalo, in the county of Erie and State of New York, have invented a new and useful Improvement in Wash-Boilers; and I do hereby declare that the following is a full and exact description thereof, reference being had to the accompanying drawing and to the letters of reference marked thereon.

In washing clothes the great object is to force the water rapidly through the fabric, and thus carry off the foreign matter.

My invention consists chiefly in so arranging a concave plate, which forms the boiling and steam-space, below the clothes, as to secure a true force and suction-current, and thus rapidly carry all the steam and water up through a tube to the top of the boiler, and then downward through the entire amount of clothes.

Figure 1:
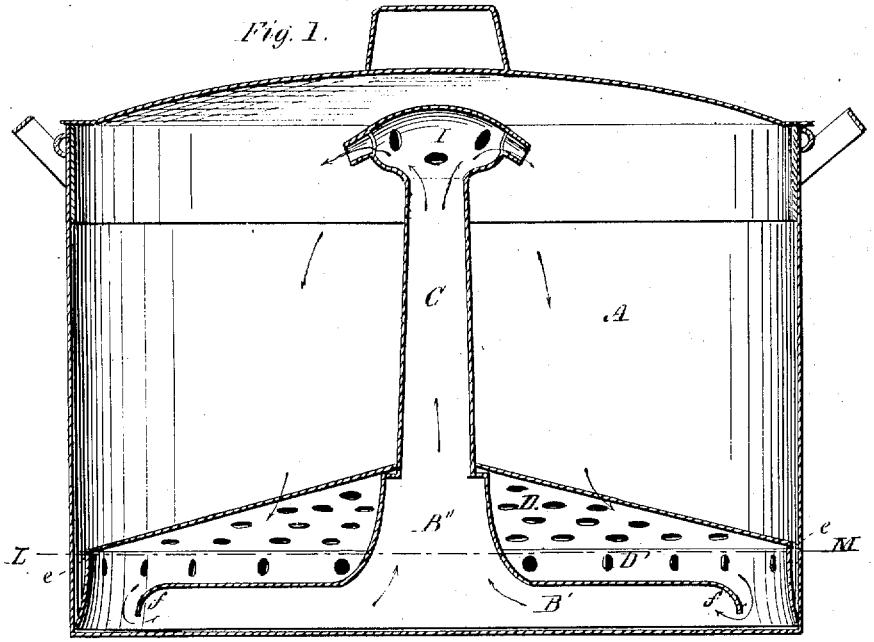
Figure 2:
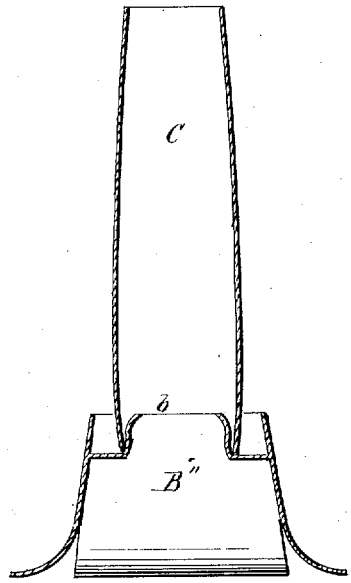

In the accompanying drawing, Figure 1 is a vertical section of a boiler with my improvements. Fig. 2 is a vertical section of the steam and boiling-space, showing the mode of fastening the central tube; Fig. 3, a view of the force and suction apparatus removed from the boiler. Fig. 4 is a bottom view of the same.

In the bottom of the boiler is fitted the boiling and steam apparatus shown in Fig. 3. The chief feature of this apparatus is a close-arched plate, B, curved down at the ends, forming flanges *f f*, and soldered to a band, B′, which fits the sides of the boiler at the bottom. Openings G, Fig. 4, are left between the close-arched plate and the band B′. At the center of this arched plate is a steam and water-space, B″, from which the tube C rises to the top of the boiler. Above the close plate is a second plate, D, which is perforated, and upon which the clothes rest. This perforated plate is soldered to the upper edge of the band B′, which has perforations between the two plates. Both this plate and the band are smaller than the boiler, leaving a space, *e*, Fig. 1, for the water to flow down at the sides of the boiler to the holes in the band. Thus the entire surface of the boiler is covered by the perforated plate and perforated part of the band, so as to secure a current of water through every part of the clothing, as will be hereinafter more fully explained.

All the steam formed in the boiler is directed into the steam and water-space B″. Whenever the steam generated is sufficient for rapid boiling the steam and water rise through the tube C and are forced out in jets from the radial tubes E upon the clothes. By this action of the steam a vacuum is formed at the bottom of the boiler, and the consequent suction draws the water suddenly through the clothes and the perforated plate D, and then along the space between the two plates B and D, and through the openings G′ to the bottom of the boiler. For the most perfect action the openings G G should have the lip or flange dipping down so near the bottom of the wash-boiler as to convey the descending cooler current directly to the cooler parts thereof—ends and bottom. The center of the boiler bottom being naturally the hottest part thereof the water overlying the same will absorb heat earlier and more rapidly than that overlying the end bottoms. The result of this absorption is the development of a tendency to rise in the water so situated and in the steam generated therefrom. The tube C offers an accessible and near outlet both for such steam and for such water the moment action becomes violent enough to lift the same. The tendency to rise does not take effect toward the openings G G, as it would if they were located on the sides of the boiler, for the reasons stated, viz., the low point to which they extend by the aid of the flanges and the location thereof at the ends furthest removed from the tube C and where the water is cooler than in the center. The slightest development of this tendency to rise in the central water-space acts, upon the vacuum principle, upon the water lying upon the plate B and near the openings G G, and when it is continued causes the water to pass nearly half the length of the boiler bottom on the way to complete the circuit up through the tube C and down through the clothes, and subsequently again through the openings G G. This series of actions takes place most readily and uniformly when the construction is, as shown, in accordance with the natural forces concerned. Thus, a complete force and suction current is set in rapid motion in the direction of the arrows, Fig. 1. The descending water being always cooler will prevent any generation of steam directly below the openings G. These rapid currents rushing through the fabric soon wash away all the dirt without any of the violence or wear which attend both machine and hand-washing.

The apparatus seen in Fig. 3 may be fitted to any old boiler.

In packing the same for transportation it is convenient to have the tube C separate from the arched plates. Therefore, I make this tube smaller at the lower end to fit a socket or short tube, *b*, which is also contracted at the end. After the tube C is pressed home the lip of tube *b* is hammered out, enlarging the diameter of this tube until the same closely fits the tube C, and thus forms a close joint. This tube may be made long enough for the larger boilers and then cut off to suit before being fastened in place. The band B′ is also made wide enough to allow the same to be spread out at the bottom, as seen in Fig. 3, to fit any boiler. The radial tubes E are set in such manner as to direct the jets higher toward the ends of the boiler and lower toward the sides, in order to act upon the whole surface of the boiler and the clothes.

In charging the boiler the apparatus, Fig. 3, is put in place and the water raised to the line L M, Fig. 1. Sufficient soap is added to make a strong suds. The clothes are then wet with cold water, properly soaped, and laid upon the plate D above the water. Now the boiler is slowly heated, the steam passing gradually over to heat the clothing. When the boiling commences the water is driven over with the steam and then sucked rapidly down through the clothing, as above described.

I do not limit my invention to the precise construction above described, as the form of the boiler and of the boiling apparatus and the special devices may be varied without departing from my invention. Also, the openings G′ may be made smaller or larger, or other openings may be made near the sides of the boiler, so long as the downward current of water will prevent the steam from rising through such openings. In a round boiler the openings G′ should be made narrower and extended more or less around the boiler, so as to accomplish the purposes desired.

I do not broadly claim discharging water at various angles on the same line or side and uniform on all sides of the supply-tube, as in spraying-cups, or the use of a deflecting-plate under a perforated false bottom when the upward current rises from the ends of such plate, while openings are left at the side of said plate the whole length, or nearly the whole length, of the boiler.

Having thus fully described my invention, what I claim, and desire to secure by a patent of the United States, is as follows:

1. The plate B, provided with the band B′, the openings G G, and the flanges F F, as set forth.

2. The plate B, in contact with or attached to the band B′, except at the ends, where it is provided with the openings G G, as set forth.

3. The combination, in a wash-boiler, of the perforated top D, close plate B having the openings G G, band B′, and central tube C, all arranged substantially as described.

C. N. TYLER.

Witnesses:
JAMES A. SKILTON,
EDM. F. BROWN.